US009638361B2

(12) United States Patent
Arment et al.

(10) Patent No.: US 9,638,361 B2
(45) Date of Patent: May 2, 2017

(54) REFRIGERATION LINE SET FITTING AND METHOD OF USING THE SAME TO JOIN REFRIGERATION LINES TO EACH OTHER

(71) Applicant: Cerro Flow Products LLC, Sauget, IL (US)

(72) Inventors: Bradley Arment, Shelbyville, MO (US); Michael Joseph Duggan, St. Louis, MO (US); Forrest Nixon, Columbia, IL (US); Michael J. Wilson, Eureka, MO (US)

(73) Assignee: RLS LLC, Shelbina, MO (US)

( * ) Notice: Subject to any disclaimer, the term of this patent is extended or adjusted under 35 U.S.C. 154(b) by 105 days.

(21) Appl. No.: 14/836,410

(22) Filed: Aug. 26, 2015

(65) Prior Publication Data

US 2015/0362098 A1    Dec. 17, 2015

Related U.S. Application Data

(63) Continuation of application No. 13/714,002, filed on Dec. 13, 2012, now Pat. No. 9,145,992.

(Continued)

(51) Int. Cl.
*F16L 13/14* (2006.01)
*F16L 17/02* (2006.01)
(Continued)

(52) U.S. Cl.
CPC .......... *F16L 13/142* (2013.01); *B21D 39/046* (2013.01); *F16L 17/02* (2013.01);
(Continued)

(58) Field of Classification Search
CPC ......... F16L 17/02; F16L 17/025; F16L 17/03; F16L 17/032; F16L 17/035; F16L 13/14;
(Continued)

(56) References Cited

U.S. PATENT DOCUMENTS 3,429,587 A    2/1969  Kish
3,596,939 A    8/1971  Gibson
(Continued)

FOREIGN PATENT DOCUMENTS

CA    2751371 A1    8/2010
CN    201096243 Y   8/2008
(Continued)

OTHER PUBLICATIONS

"Specification for Seamless Copper Tube", ASME Boiler and Pressure Vessel Code, Section II—Materials, 2004, American Society of Mechanical Engineers, http://app.knovel.com/hotlink/toc/id:kpASMEBP06/asme-boiler-pressure/asme-boiler-pressure.

*Primary Examiner* — Jason L Vaughan
(74) *Attorney, Agent, or Firm* — Thompson Coburn LLP; Clyde L. Smith (57) ABSTRACT

A crimp fitting comprises a metal tube wall that forms both a cylindrical tube portion and an adjacent annular O-ring channel portion. The tube wall has a first wall thickness along the cylindrical tube portion and a second wall thickness along at least part of the O-ring channel portion. The second wall thickness is less than the first wall thickness. The cylindrical tube portion and O-ring channel are configured and adapted to encircle a cylindrical end portion of a tube when such end portion of the tube is inserted into the fitting.

12 Claims, 13 Drawing Sheets

Related U.S. Application Data (60) Provisional application No. 61/609,039, filed on Mar. 9, 2012, provisional application No. 61/580,993, filed on Dec. 28, 2011.

(51) Int. Cl.
*B21D 39/04* (2006.01)
*F16L 21/03* (2006.01)

(52) U.S. Cl.
CPC ............... *F16L 21/03* (2013.01); *Y10T 29/49* (2015.01); *Y10T 29/49906* (2015.01); *Y10T 29/49927* (2015.01)

(58) Field of Classification Search
CPC ..... F16L 13/141; F16L 13/142; F16L 13/143; B21D 39/046; Y10T 29/49; Y10T 29/49927; Y10T 29/49906; Y10T 29/49908
See application file for complete search history.

(56) References Cited

U.S. PATENT DOCUMENTS

| | | |
|---|---|---|
| 3,603,619 A | 9/1971 | Bengesser et al. |
| 3,638,970 A | 2/1972 | Sandquist et al. |
| 3,822,464 A | 7/1974 | Hester et al. |
| 4,130,302 A | 12/1978 | Mitchell et al. |
| 4,277,091 A | 7/1981 | Hunter |
| 4,371,199 A | 2/1983 | Kushner et al. |
| 4,541,655 A | 9/1985 | Hunter |
| 4,541,659 A | 9/1985 | Nakamura |
| 4,664,423 A | 5/1987 | Rowley |
| 5,007,667 A | 4/1991 | Unewisse et al. |
| 5,052,608 A | 10/1991 | McClure |
| 5,228,721 A | 7/1993 | Whittle et al. |
| 5,484,174 A | 1/1996 | Gotoh et al. |
| 5,918,914 A | 7/1999 | Morris |
| 6,202,284 B1 | 3/2001 | Joblin |
| 6,481,764 B1 | 11/2002 | Kwok |
| 7,503,593 B2 | 3/2009 | Kim |
| 9,145,992 B2 | 9/2015 | Arment et al. |
| 2005/0151120 A1 | 7/2005 | Philipson |
| 2008/0048448 A1 | 2/2008 | Jamison et al. |
| 2009/0173130 A1 | 7/2009 | Duggan et al. |
| 2010/0007140 A1 | 1/2010 | Duquette et al. |
| 2010/0133808 A1 | 6/2010 | Castiglioni et al. |
| 2010/0156097 A1 | 6/2010 | Steiner |
| 2010/0253066 A1 | 10/2010 | Cygler, III et al. |
| 2012/0161438 A1 | 6/2012 | Rischen et al. |

FOREIGN PATENT DOCUMENTS

| | | |
|---|---|---|
| CN | 101553683 A | 10/2009 |
| DE | 19840668 C1 | 11/1999 |
| EP | 0781606 A2 | 7/1997 |
| EP | 2469142 A1 | 6/2012 |
| JP | S62-113986 A | 5/1987 |
| JP | H07-004584 | 1/1995 |
| JP | 2008-064187 A | 3/2008 |
| JP | 2009-168075 A | 7/2009 |

REFRIGERATION LINE SET FITTING AND METHOD OF USING THE SAME TO JOIN REFRIGERATION LINES TO EACH OTHER

CROSS-REFERENCE TO RELATED APPLICATIONS

This patent application is a continuation of non-provisional patent application Ser. No. 13/714,002, which was filed on Dec. 13, 2012 and is currently pending, which claims the benefit of provisional patent application Ser. No. 61/609,039, filed on Mar. 9, 2012, and also claims the benefit of provisional patent application Ser. No. 61/580,993, filed on Dec. 28, 2011.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

The present invention pertains to fittings for attaching line sets to indoor and outdoor HVAC units and joining refrigeration components. More specifically, the present invention pertains to crimp fittings that can be used to attach two conventional tube ends to each other. The crimp fittings are specifically adapted and configured to sealably connect tubes that are under significant pressure (such as tubes in HVAC and other high pressure refrigerant systems).

General Background

It is common practice to utilize copper, aluminum, or other appreciably malleable tube in refrigeration systems. While conventional soldering techniques can be used to join some of such tubes (copper tubes in particular), soldering or brazing can have disadvantages. For example, soldering/brazing typically involves the use of a torch, which creates an inherent fire risk. This can be problematic or prohibited in situations where high pressure tubes need to be joined in buildings while such buildings are open to the public. Additionally, soldering/brazing aluminum, while possible, is difficult and is generally considered not practical for joining refrigeration and HVAC lines. Moreover, heat from the brazing/soldering operation often causes oxidation on the inside surfaces of such tubes, unless the installer takes additional steps to avoid such oxidation (for example, by flowing a purging gas such as nitrogen through the tube while applying heat).

The use of crimp fittings to join tube ends is a known alternative to soldering/brazing in low pressure applications. While many crimping techniques have been used to join various types of tubes in various circumstances, the relatively high pressures associated with refrigeration and HVAC lines make it difficult to achieve leakless connections. Moreover, in many high pressure connections, such crimp fittings must carry axial tension loads induced by the pressure. Such axial loads and internal pressures can cause the tube ends to deform and separate from the crimp fitting. Such separation is particularly difficult to prevent when the tubes are appreciably malleable.

SUMMARY OF THE INVENTION

The crimp fittings in accordance with the present invention include sleeve fittings that slide over the opposing end margins of two tubes being joined. In general, each sleeve fitting comprises a pair of internal O-ring channels that are spaced from the ends of the fitting. The O-ring channels are each adapted and configured to receive an elastic O-ring that deforms against the end margin of respective one of the two tubes to form a high pressure seal. Each sleeve may also comprise an internal protrusion that is formed centrally between the ends of the fitting. The internal protrusion serves as a "stop" that limits how far the end margin of a tube can be inserted into the fitting. The end margins of the fitting outboard of the O-rings are configured and adapted to be crimped radially inward to thereby deform along with the tubes inserted into the fitting. This deformation creates interlocking geometry between the fitting and the tubes that prevents the tubes from pulling out of the fitting. The pullout strength of a connection made using a fitting of the invention can be increased by crimping the fitting in a manner that causes additional plastic deformation in the crimp regions of the fitting. The plastic deformation work hardens the crimped regions of the fitting and thereby makes such regions of the fitting less malleable after crimping. If desired, several crimping bands can be formed during the crimping operation on the end of the fitting to increase the extent of interlocking geometry.

Additionally, a crimp fitting in accordance with the invention can be formed out of the end of a tube in a manner such that the fitting is an integral and monolithic portion of the tube that is adapted to receive the end of another tube.

Further features of the invention are set forth in the following detailed description and in the drawing figures.

Reference numerals in the written specification and in the drawing figures indicate corresponding items.

DETAILED DESCRIPTION

Figure 1A:
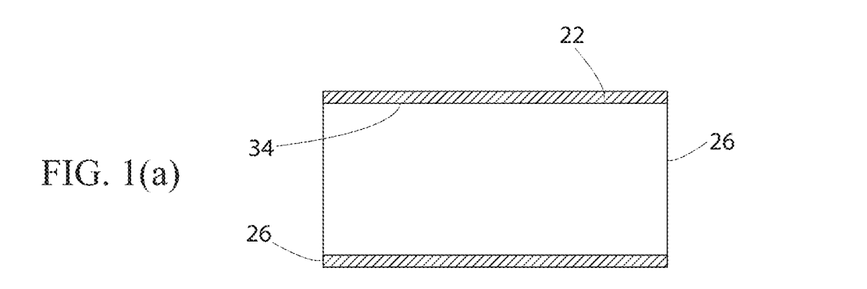
FIGS. 1(a), 1(b), and 1(c) depict cross-sectional views (parallel to the center axis) of various stages of the formation of one embodiment of a crimp fitting in accordance with the invention.
Figure 1B:
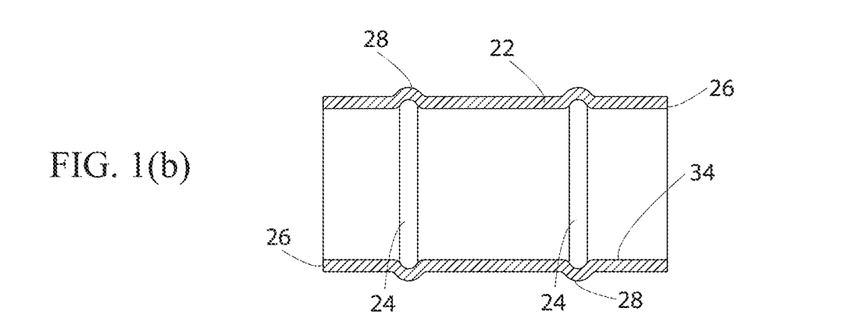
Figure 1C:
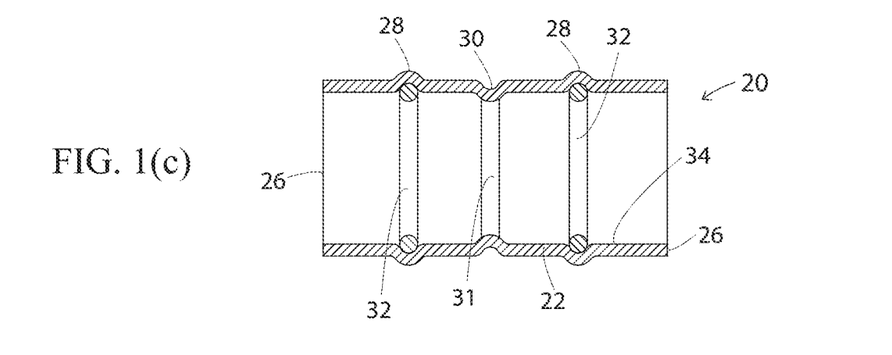

An embodiment of a crimp fitting in accordance with the invention is shown in FIG. 1(c). The crimp fitting 20 is preferably formed from a straight section of tube 22, as shown in FIG. 1(a). Two interior O-ring channels 24 are preferably hydroformed into the tube section 20 intermediate the opposite ends 26 of the tube section. This also creates two annular protrusions 28 on the exterior of the tube section 22. An annular indentation 30 is also preferably hydroformed into the exterior of the tube section 20 centrally between the opposite ends 26 of the tube section and the O-ring channels 24. This creates an interior annular protrusion 31. Elastic O-rings 32 are fitted into the O-ring channels 24 and protrude radially inward from the main interior surface 34 of the tube section 22. Preferably the O-rings are formed of a polymeric material that is chemically compatible with the particular fluid in the system that the crimp fitting will be used. In lieu of the O-rings 32, a gasket could be molded into the fitting (for example, via thermoplastic or other curing materials). The main interior surface 34 of the tube section 22 preferably has diameter that is equal to or only slightly greater than the outer diameter of the tubes that the crimp fitting 20 is configured to join. For joining one-half inch (1.27 cm) tube having a wall thickness of 0.032 inches (0.81 mm), the tube section 22 preferably has a wall thickness of approximately 0.060 inches (1.524 mm). The wall thickness of the portion of the crimp fitting 20 that lies between the two annular protrusions 28 could be thinner than the wall thickness of the portions of the crimp fitting outboard the two annular protrusions, to thereby conserve material without negatively impacting the performance of the crimp fitting 20.

Figure 2A:
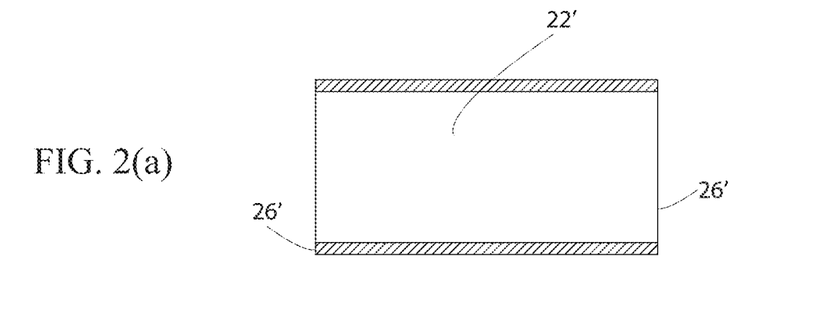
FIGS. 2(a), 2(b), 2(c), and 2(d) depict cross-sectional views, similar to those of FIGS. 1(a), 1(b), and 1(c), of another embodiment of a crimp fitting in accordance with the invention.
Figure 2B:
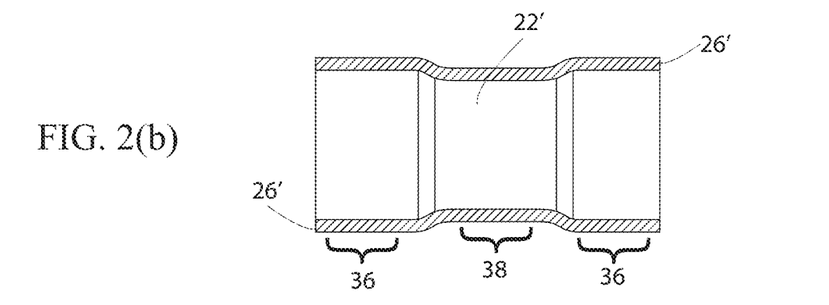
Figure 2C:
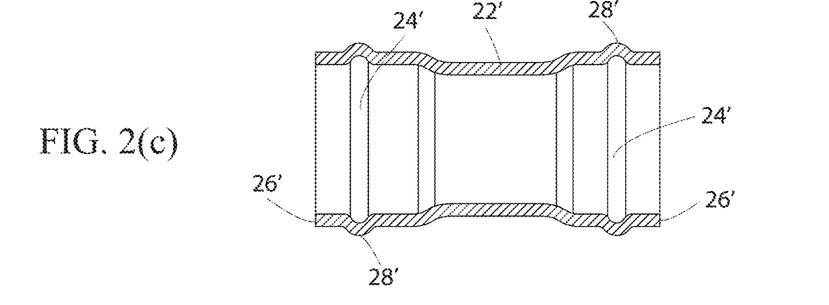
Figure 2D:
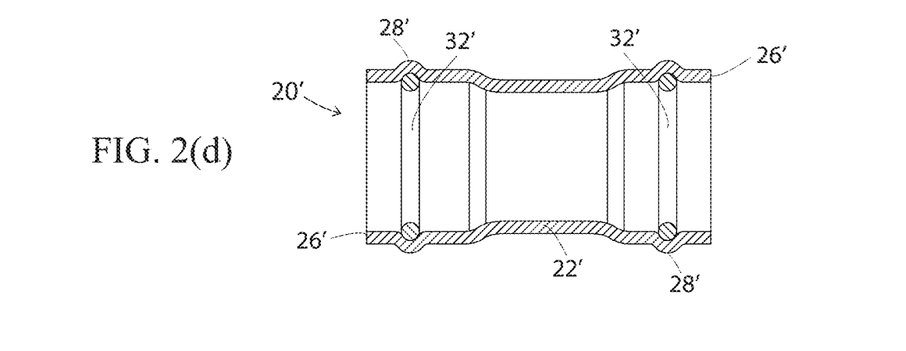

Another embodiment of a crimp fitting in accordance with the invention is shown in FIG. 2(d). This crimp fitting 20' is also preferably hydroformed. The crimp fitting 20' is preferably formed from a straight section of tube 22' as shown in FIG. 2(a), which has a diameter slightly less than the diameter of the tubes in which it is configured to join. As shown in FIG. 2(b), the opposite end margins 36 of the tube section 22' are flared radially outwards so as to have an interior diameter that is equal to only slightly greater than the outer diameter of the tubes that the crimp fitting 20' is configured to join. The central portion 38 of the tube section 22' is not flared and is left at its original diameter. As shown in FIG. 2(c), two interior O-ring channels 24' are preferably formed into the tube section 20' intermediate the opposite ends 26' of the tube section. As with the other embodiment described above, this also creates two annular protrusions 28' on the exterior of the tube section 22'. As shown in FIG. 2(d), elastic O-rings 32' are fitted into the O-ring channels 24' and protrude radially inward from the end margins 36 of the tube section 22', completing the formation of the crimp fitting 20'. Preferably the O-rings are formed of a polymeric material. And again, in lieu of the O-rings 32', gaskets could be molded into the fitting.

Rather than hydroforming the fittings, alternatively, the crimp fittings could be turned for tube sizes larger than ½" (1.27 cm) and, due to difficulties associated with internally roll forming small diameter tube, the smaller crimp fittings could be formed using upset forging for tube sizes smaller than ½" (1.27 cm) (of course the larger diameter tube could also be upset forged and, although difficult, small diameter tube could be roll formed).

Both embodiments of the crimp fittings 20, 20' described above are utilized in a similar manner. As such, only the use of the first described crimp fitting 20 is herein described. However, it should be appreciated that the central portion 38 of the second described crimp fitting 20' serves the same purpose as the interior annular protrusion 31 of the first described crimp fitting 20.

Figure 3A:
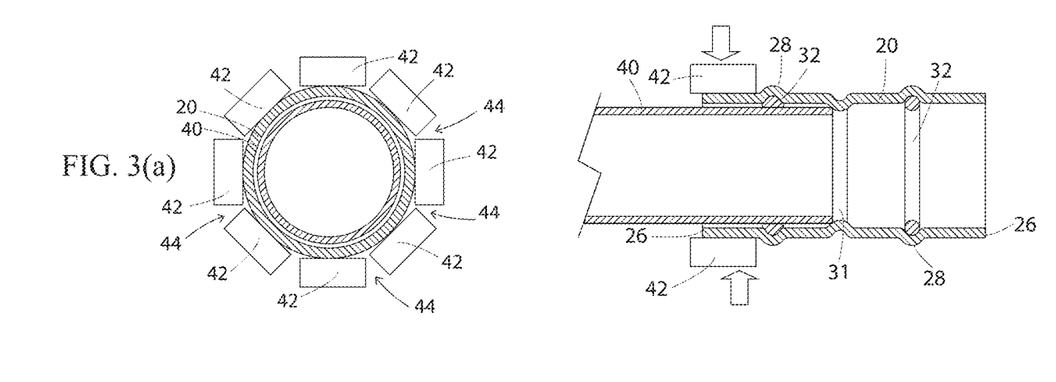
FIGS. 3(a) and 3(b) depict axial and cross-sectional views of a method of crimping the fitting shown in FIG. 1(c).
Figure 3B:
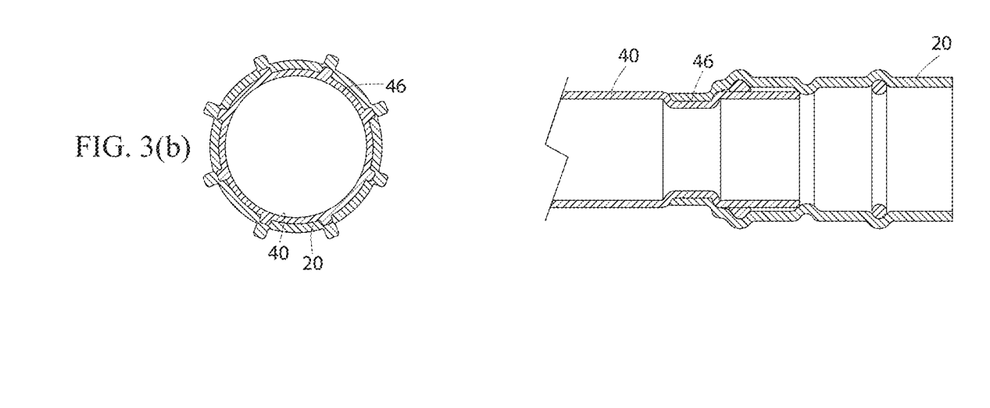
Figure 4A:
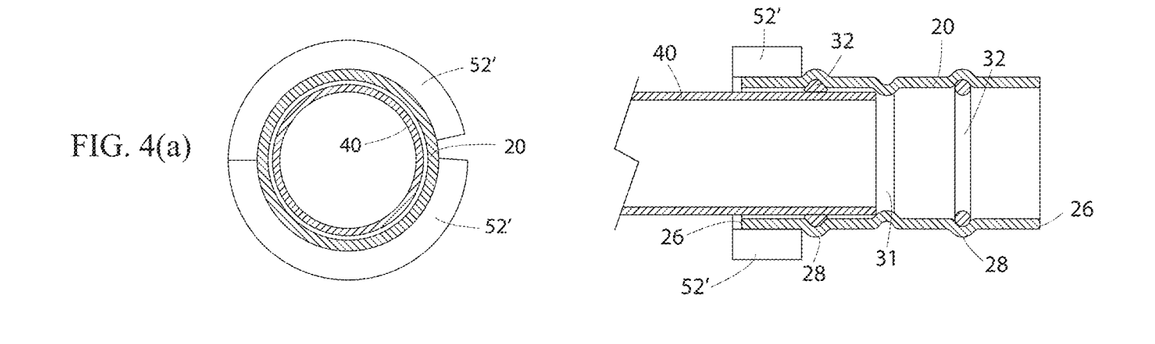
FIGS. 4(a) and 4(b) depict axial and cross-sectional views of another method of crimping the fitting shown in FIG. 1(c).
Figure 4B:
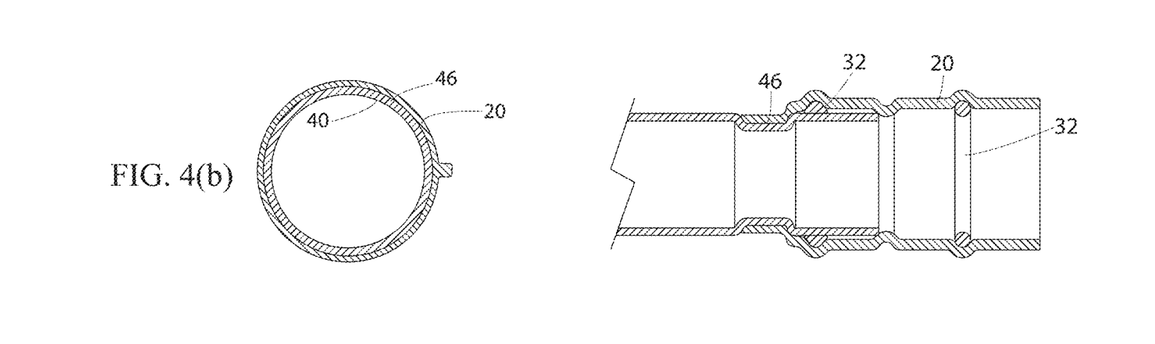

The crimp fitting 20 is used to join tubes by initially inserting at least one of the tubes 40 being joined into the crimp fitting. Each tube 40 is limited as to how far it can be inserted into the crimp fitting 20 by the interior annular protrusion 31, which has a smaller diameter than the tube. This ensures that the midpoint between the two tubes 40 is not offset to either side of the crimp fitting 20. This also causes the O-rings 32 to compress radially outward and exert annular compressive pressure on the outer surface of the tube 40 and on the O-ring channels 24, thereby creating a pressure seal. The crimp fitting 20 can then be crimped to the tube 40 using any of a variety of crimping tools and methods. One method is schematically represented in FIG. 3(a). This method involves a crimping tool that presses at least three dies 42 radially inward on the exterior of the crimp fitting 20 adjacent the respective end 26 of the crimp fitting and out board of the annular protrusion 28. Gaps 44 between the dies 42 provide a place for the material from the crimp fitting 20 to flow into as the crimp fitting 20 locally deforms under the pressure exerted on it by the dies (see FIGS. 3(a) and 3(b)). The portion of the crimping fitting 20 being crimped plastically deforms radially inward in a manner that also causes the tube 40 between the dies 42 to plastically deform uniformly and radially inward. A uniform compression around the circumference of the crimping fitting 20 prevents the inserted tube from collapsing or folding which could create a leak path. As such, an external indentation 46 is formed in the tube 40 that is interlocked with the crimp fitting 20. This prevents the tube 40 from being axially separated from the crimp fitting 20 when a tension load is exerted therebetween. By providing the gaps 44 for the material from the crimp fitting 20 to flow into as the crimp fitting 20 is deforming, more localized deformation of the crimp fitting occurs than would otherwise occur.

Figure 6:
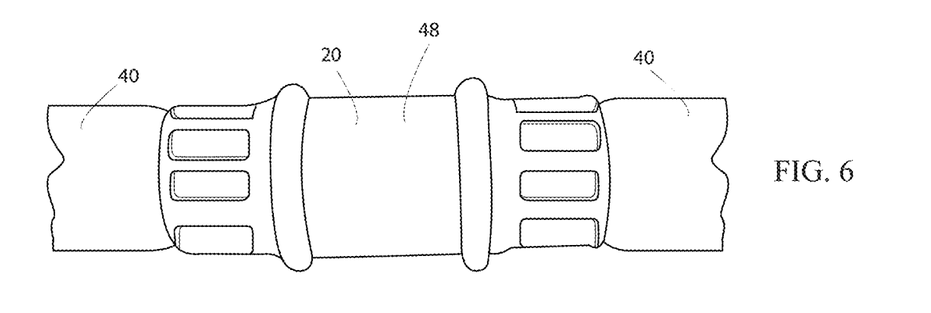
FIG. 6 depicts a perspective view of a tube joint in accordance with the invention.

The greater deformation causes more work hardening to occur and thereby provides crimp fitting 20 with superior pullout strength. Once both sides of the crimp fitting 20 have been attached to a tube 40, the crimped joint 48 (see FIG. 6) is complete and can be put into service.

Figure 7:
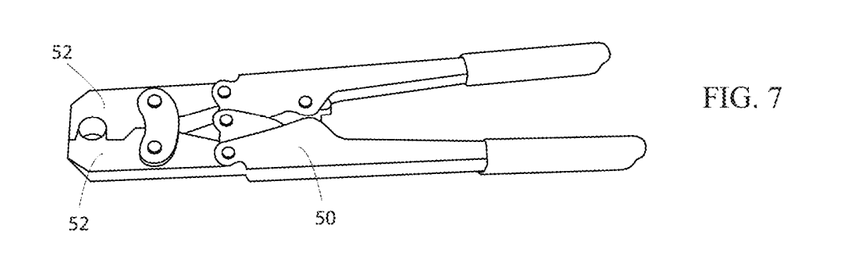
FIG. 7 depicts a two-jaw crimping tool that can be used to crimp fittings in accordance with the invention.
Figure 8:
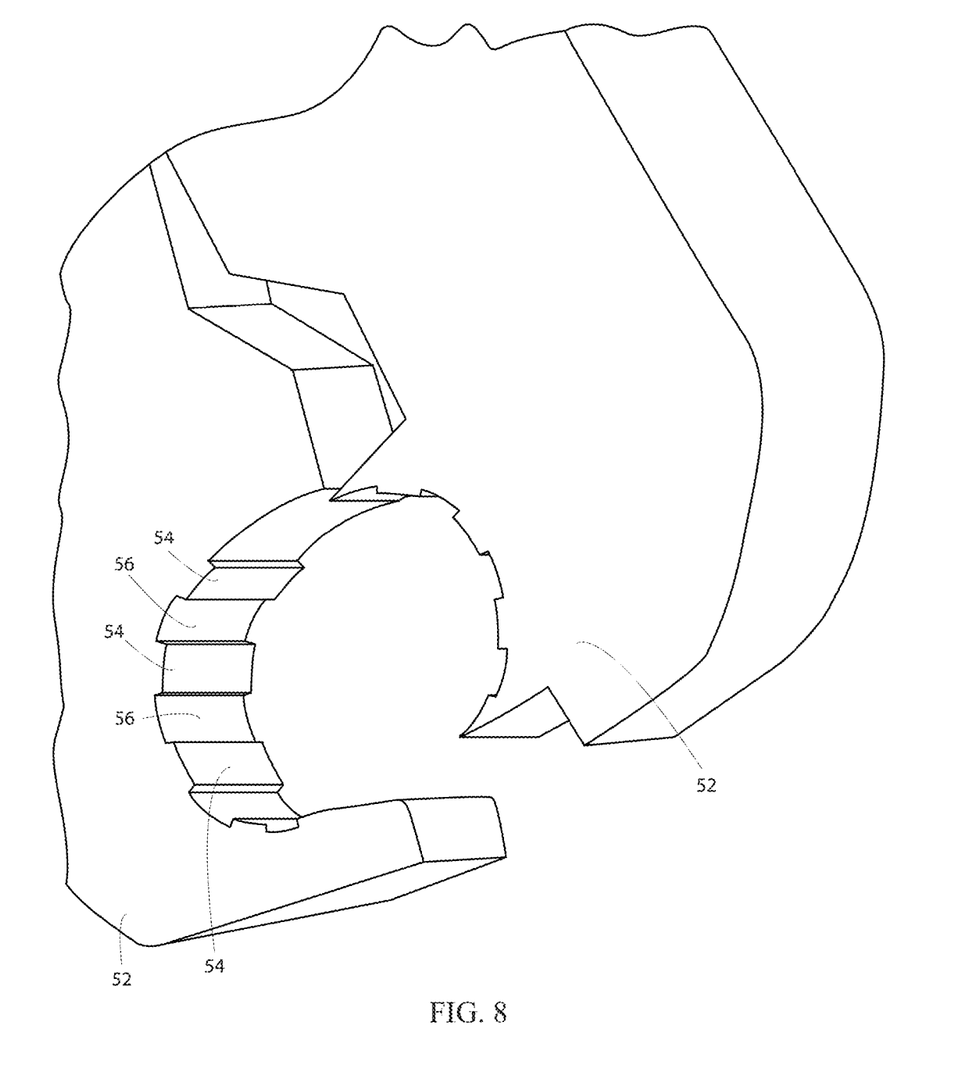
FIG. 8 depicts a detailed view of the jaws of a crimping tool that has grooves that are configured to increase work hardening of the crimped region of a fitting.
Figure 9:
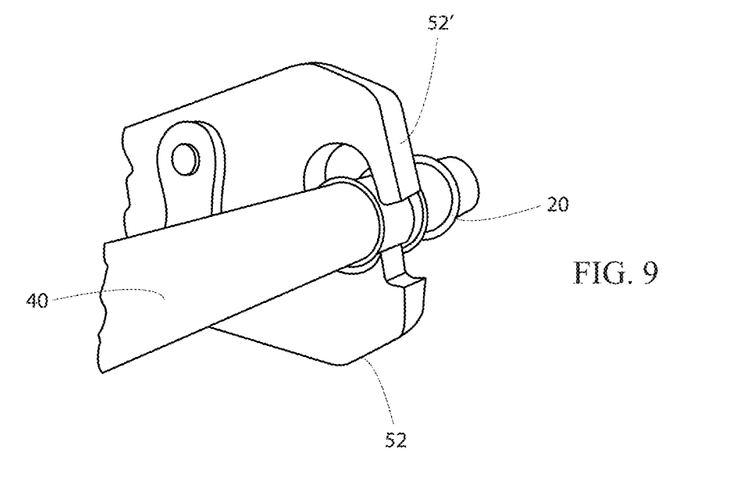
FIG. 9 depicts a two-jaw crimping tool being used to crimp a fitting in accordance with the invention.
Figure 10:
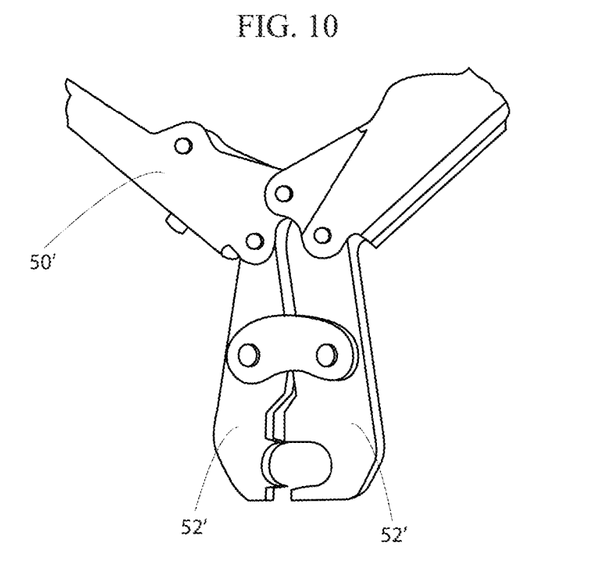
FIG. 10 depicts a detailed view of the jaws of a crimping tool that is devoid of grooves.
Figure 11:
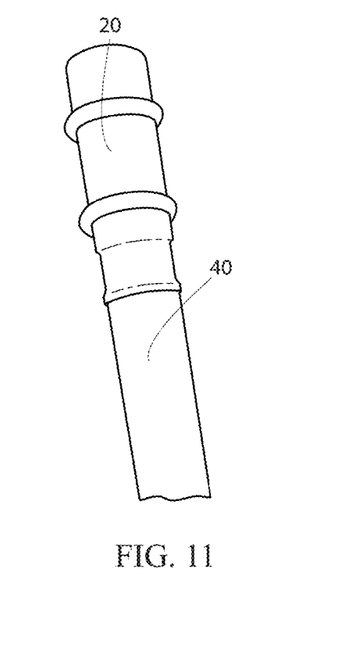
FIG. 11 depicts a perspective view of tube joint in accordance with the invention formed using the crimping tool shown in FIG. 10.

Another method of crimping the crimp fitting 20 utilizes a two-jaw crimping tool 50 (shown in FIG. 7) that is similar in operation to a compound bolt cutter. As shown in FIG. 8, the jaws 52 of the two-jaw crimper 50 can be provided with undulating protrusions 54 and recesses 56. The recesses 56 act much like the gaps 44 between the dies 42 in the crimping method described above. Alternatively, as shown in FIGS. 4(a), 4(b), and 9-11, the jaws 52' of a two-jaw crimping tool 50' can be smooth such that, after crimping, the deformed portion of the crimp fitting 20 forms almost a complete annular ring.

Figure 5A:
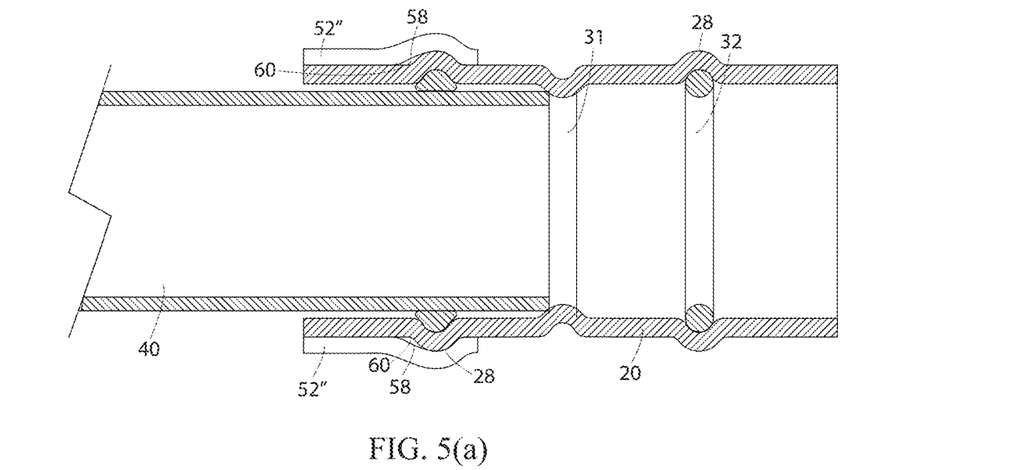
FIGS. 5(a) and 5(b) depict cross-sectional views of yet another method of crimping the fitting shown in FIG. 1(c).
Figure 5B:
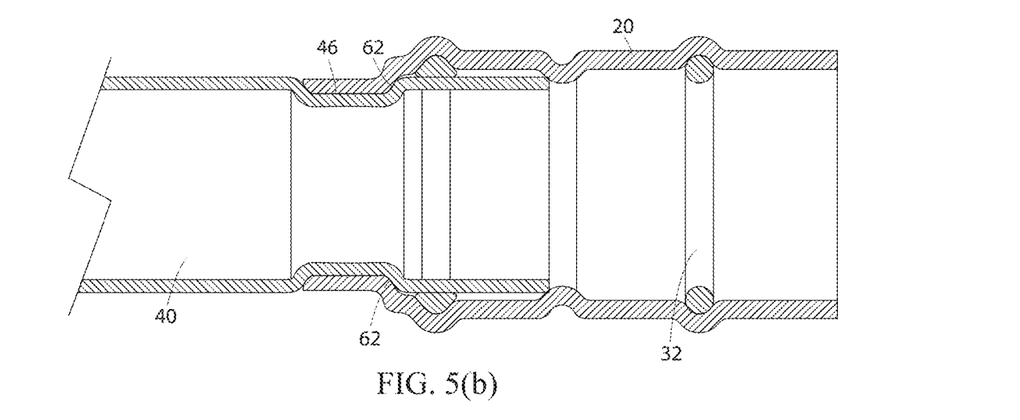

Still other types of crimping methods can be used to crimp the crimp fitting 20. For example, as shown in FIG. 5(a), the two jaws 52" of a two-jaw crimping tool 50" could be contoured so as to straddle either one of the annular protrusions 28 of the crimp fitting 20. The portion of the jaws 52" that straddle the annular protrusions 28 can be configured to contact and crimp the annular protrusion 28, albeit preferably not as much as it does the main crimp outboard of the protrusion. This can further compress the respective O-ring 32 providing for greater pressure sealing capability. Additionally, by straddling the annular protrusion 28, the annular protrusion can serve as a locating mechanism to ensure that the crimping tool is properly positioned on the crimp fitting 20 during the crimping process. The contour of the jaws 52" may also comprise an annular indentation 58 immediately adjacent the portion of the jaws that are configured and adapted to straddle the annular protrusion 28 of the crimp fitting 20. As shown in FIG. 5(b), this creates an annular gap 60 to ensure that appreciable interlocking annular step 62 is still formed in the crimp fitting 20 and the respective tube 40 inserted therein, and thereby ensures that the joint will still have a high pullout strength.

Figure 12:
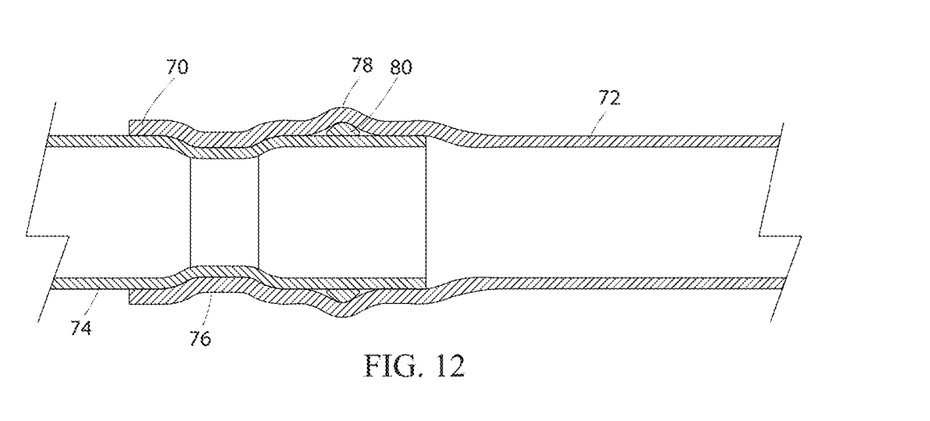
FIG. 12 depicts a cross-sectional view of another embodiment of a crimp fitting in accordance with the invention, after the crimping has been performed.

Yet another embodiment of a crimp joint is depicted in FIG. 12. Rather than being a separate component used to attach two tubes, the crimp fitting 70 of this joint is formed on the end of a first tube 72 or on a stub-out that is connected to a refrigeration or HVAC component. The first tube 72 may have a diameter and thickness equal to that of the second tube 74 that forms the joint. As such, the first tube 72 may be flared (as shown) to form the crimp fitting. However, the first tube 72 could also simply have inner diameter that is just slightly larger than the outer diameter of the second tube 74. Obviously, this crimp fitting 70 would require only one crimp 76 since it is formed integrally with the first tube 72. Like the other crimp fittings discussed above, this crimp fitting 70 also comprises an annular protrusion 78 resulting from the formation of an O-ring channel that provides a space from an O-ring 80. The crimp 76 itself can be formed by any of the methods discussed above. Additionally and as shown, the crimp fitting 70 could be formed such that the crimp fitting 70 has a wall thickness that is larger than the wall thickness of the remainder of the first tube 72.

Figure 13:
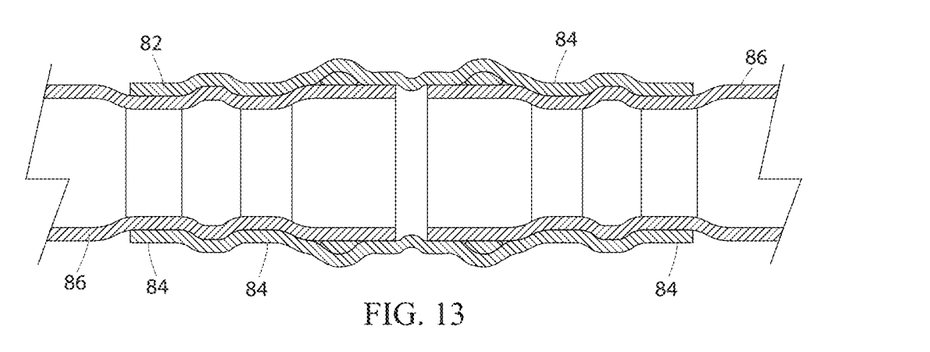
FIG. 13 depicts a cross-sectional view of a crimp fitting in accordance with the invention after crimping, wherein the fitting is crimped via an alternative crimping style that creates a double crimp on each of the opposite ends of the fitting.

FIG. 13 depicts a joint having a fitting 82 similar to the fitting shown in FIG. 1 that has been crimped using an alternative method that creates two spaced-apart annular indentations 84 on each of the opposite ends of the fitting. The pair of indentations 84 on any given end of the fitting 82 can be created separately by using a crimping tool twice. Alternatively, the pair of indentations on any given end of the fitting can be formed simultaneously via a single crimping tool configured and adapted to form two annular indentations rather than one. This method creates additional undulations in the interlocking geometry between crimp fitting 82 and the tubes 86 being joined by the crimp fitting. In some cases, these additional undulations increase the maximum tension that can be transferred from one of the tubes 86 to the other through the joint. Of course, such double annular indentations could also be formed into any of the crimp fittings disclosed herein during the joining process.

Figure 14:
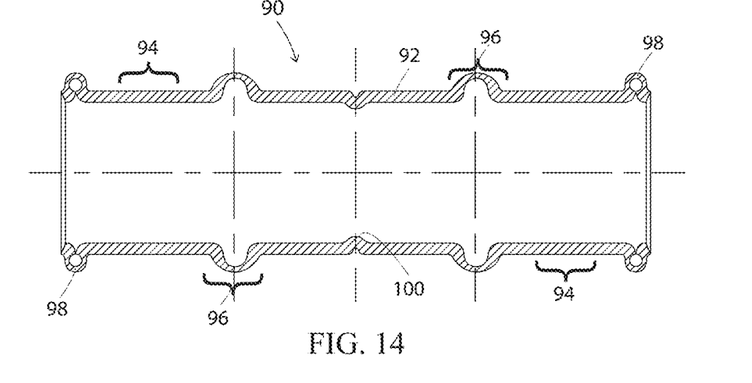
FIG. 14 depicts a cross-sectional view of yet another crimp fitting in accordance with the invention, wherein the wall of fitting has a non-uniform wall thickness.

FIG. 14 depicts yet another fitting 90. That fitting 90 has a tube wall 92 that varies in thickness. The tube wall 92 forms a cylindrical tube portion 94 and an adjacent annular O-ring channel portion 96 on each of its opposite end portions. Each cylindrical tube portion 94 is configured to be crimped (described below). The tube wall 92 has a first thickness along the cylindrical tube portions 94, and a second thinner wall thickness along the O-ring channel portions 96 (the thicknesses being average wall thicknesses of such regions). The second wall thickness is preferably less than 82% of the first wall thickness. Each O-ring channel portion 96 of the fitting 90 protrudes radially outward relative to the adjacent cylindrical tube portion 94. The tube wall 92 also forms annular positioning protrusions 98 that are each adjacent a respective one of the cylindrical tube portions 94 opposite the respective O-ring channel portion 96. Preferably the positioning protrusions 98 are located at the opposite terminal ends of the fitting 90. The tube wall 92 further forms an annular insertion stop 100 that protrudes radially inward relative to the cylindrical tube portions 94. The annular insertion stop 100 is preferably centrally positioned between the opposite ends of the fitting 90 and, as explained below, serves to prevent a tube from being over or under inserted into either end of the fitting. The tube wall 92 is preferably formed of copper using any of the techniques described above. After the tube wall 92 of the fitting 90 is fabricated, it is preferably annealed to a grain size in the range of 0.005 to 0.070 millimeters, and more preferably to grain size in the range of 0.015 to 0.035 millimeters.

Figure 15:
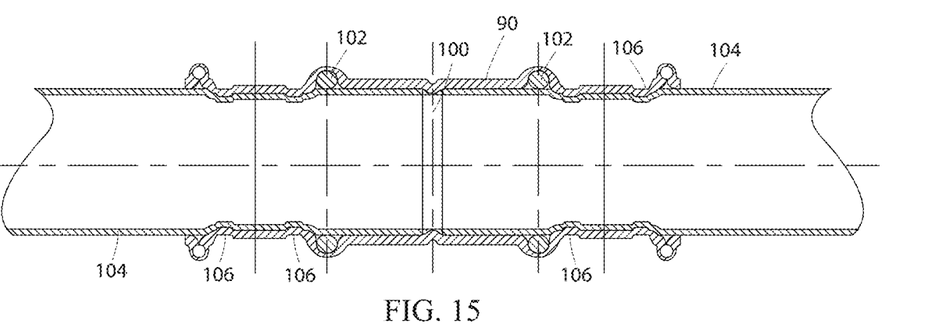
FIG. 15 depicts a cross-sectional view of a crimped tube joint assembly that comprises the fitting depicted in FIG. 14.

Prior to using the fitting 90 to join two tubes, an elastic O-ring 102 is positioned in each of the O-ring channel portions 96. With the O-rings 102 in place, the fitting 90 can be joined to a tube 104 by inserting an end portion of the tube into one end of the fitting until the end of the tube engages the insertion stop 100, which prevents further insertion of the tube into the fitting and ensures that the end of tube 104 has been inserted through the respective O-ring. The insertion of the end portion of the tube 104 into the fitting 90 compresses the respective O-ring 102 radially between the tube and the O-ring channel portion 96 of the fitting. The assembly can then be crimped, preferably by using a crimper that creates multiple annular deformations 106 radially into the assembly (as shown in FIG. 15). Preferably, the crimper is dimensioned to fit snuggly between the annular protrusion created by the O-ring channel portion 96 of the fitting 90 and the respective positioning protrusion 98 such that proper positioning of the annular deformations 106 is ensured. The annular deformations 106 plastically/non-resiliently deform annular bands of the cylindrical tube portion 94 of the fitting 90 and adjacent annular bands of the tube 104 radially inward, thereby creating interlocking geometry between the two components. The interlocking geometry prevents the tube 104 from disengaging the fitting 90 when there is a tension load between the two components. The crimping work hardens the copper of the fitting 90 and the tube 104 at the annular deformations 106, and thereby increases the strength of the interlocking geometry. Due to the decreased thickness of the O-ring channel portion 96 of the tube wall 92 relative to the thickness of the cylindrical tube portion 94 of the tube wall, the crimping process also causes the O-ring channel portion of the tube wall to plastically deform radially inward, albeit not as drastically as the annular deformations 106. This causes further radial compression of the O-ring 102 between the fitting 90 and the tube 104 inserted therein. This process can then be repeated to attach another tube 104 to the opposite end of the fitting 90. Upon internally pressurizing the assembly, the fitting 90 will most often be under axial tension, which, due to decreased thickness of the fitting 90 along the O-ring channel portions 96 of the tube wall 92, can cause the O-ring channel portions to slightly elongate in the area of the thinner wall in the O-ring channel portions 96, which in turn causes the area at the apex of the O-ring channel portions 96 to partially radially collapse. This still further compresses the O-rings 102 between the fitting 92 and the end of the tubes 104 inserted therein, and thereby increases their ability to hold pressure. It should be appreciated that the annealed condition of the fitting 90 impacts the degree to which this occurs.

Figure 16:
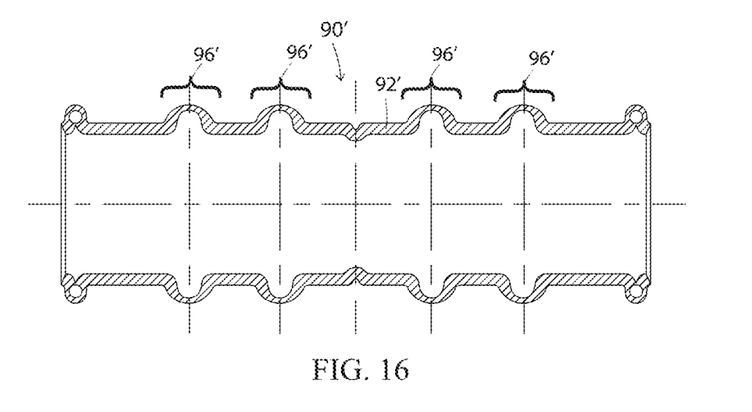
FIG. 16 depicts a cross-sectional view of a fitting that is identical to the fitting shown in FIG. 14, except that the fitting shown in FIG. 16 has multiple O-rings channel portions on each end of the fitting.
Figure 17:
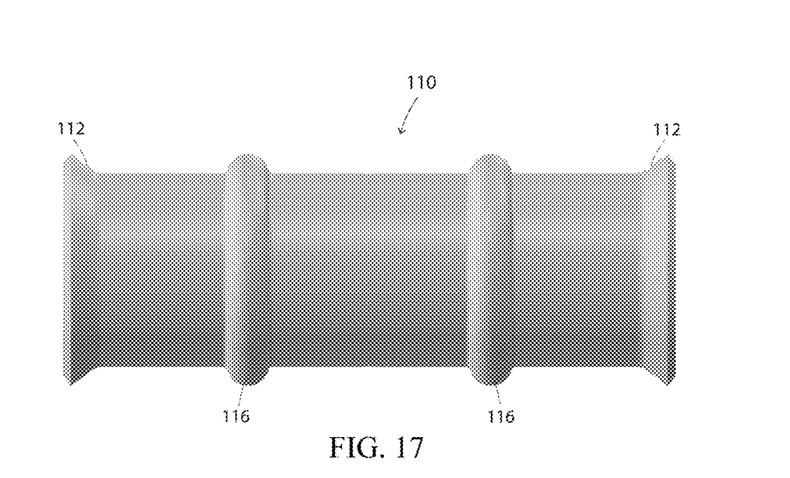
FIG. 17 depicts a front view of yet another embodiment crimp fitting in accordance with the invention, wherein the wall of fitting has a non-uniform wall thickness and the ends of the crimp fitting flare outward.
Figure 18:
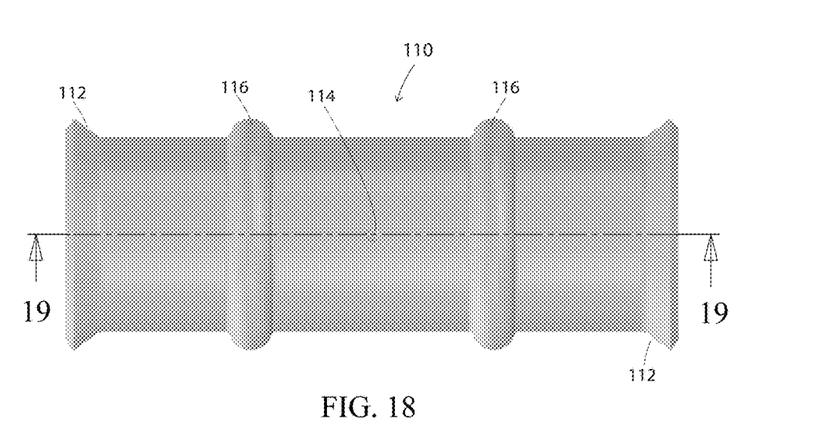
FIG. 18 depicts a top view of the fitting depicted in FIG. 17.
Figure 19:
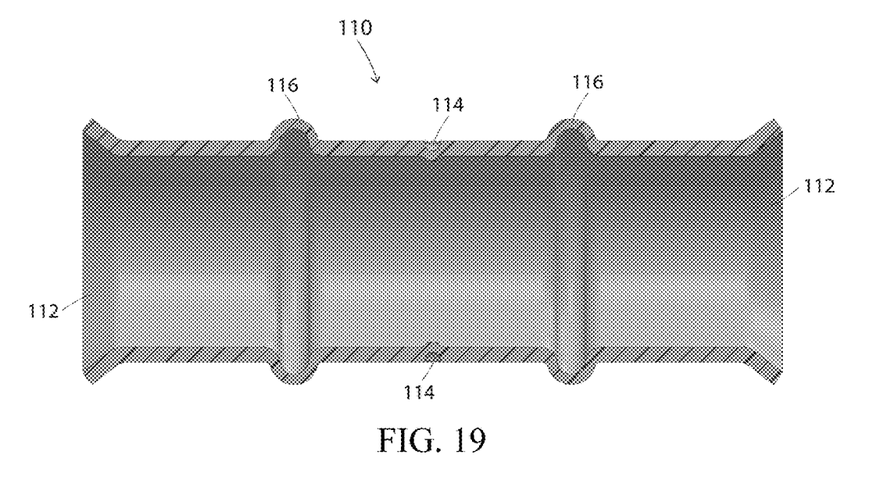
FIG. 19 depicts a cross-sectional view of the fitting depicted in FIGS. 17 and 18, taken about the line 19-19 shown in FIG. 18.
Figure 20:
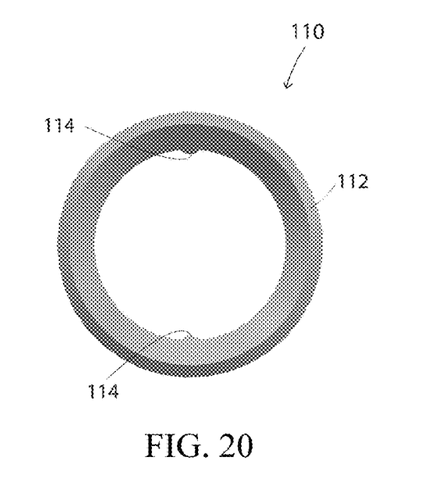
FIG. 20 depicts a right view of the fitting depicted in FIGS. 17-19.
Figure 21:
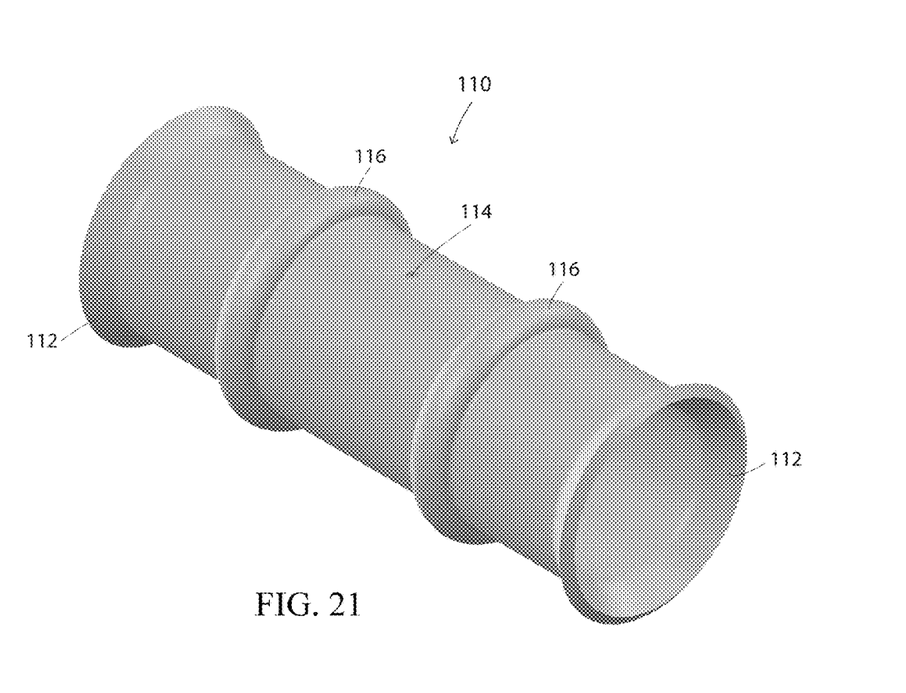
FIG. 21 depicts and perspective view of the fitting shown in FIGS. 17-20, and shows the front, top, and right sides thereof.

FIG. 16 depicts a fitting 90' that is identical to the fitting 90 shown in FIG. 14 except that its tube wall 92' comprises multiple O-ring channel portions 96' on each end of the fitting. As such, this fitting 90' is configured to receive multiple O-rings in each end of the fitting. Unlike the outboard O-ring channel portions 96', the inboard O-ring channel portions will not plastically deform during the crimping process. However, like the outboard O-ring channel portions 96', the inboard O-ring channel portions 96' are thinner than the adjacent portions of the fitting 90' and will partially collapse as the fitting tries to axially expand under pressure.

It should be appreciated that the configuration of one half of the fitting 90 shown in FIG. 14 or the fitting 90' shown in FIG. 16 could be formed as an integral portion of a long tube or stub-out that is connected to a refrigeration, HVAC, or other fluid component. Thus, the aspects of the fitting described above need not be limited to fittings that are configured to receive two separate tubes.

Yet another crimp fitting in accordance with the invention is shown in FIGS. 17-21. This crimp fitting 110 is identical in form and function to the fitting 90 shown in FIG. 14, with only a few exceptions. Unlike the crimp fitting shown in FIG. 14, the crimp fitting shown in FIGS. 17-21, comprises flared portions 112 adjacent its opposite ends rather than annular positioning protrusions 98. Additionally, the fitting 110 shown in FIGS. 17-21 comprises dimple insertion stops 114, rather than the annular insertion stop 100 of the fitting 90 depicted in FIG. 14. The flared portions 112 of the fitting 110 preferably flare outward at an angle between thirty and forty degrees from the centerline of the fitting, and more preferably at an angle of approximately thirty-seven degrees. Like with the annular positioning protrusions 98 of the fitting 90 depicted in FIG. 14, the flared portions 112 of the fitting 110 are positioned such that that the crimper will fit snuggly between the annular protrusion created by the O-ring channel portion 116 of the fitting 110 and the respective flared portion 112 to ensure that fitting will be crimped at the proper locations. The flared portions 112 also serve to protect the fitting 110 from damage in the event the fitting is dropped. If the fitting 110 is dropped, the flared portions 112 will likely take the brunt of the impact and may deform as a result, but without adversely affecting the functionality of the fitting. Still further, the flared portions 112 of the fitting 110 also facilitate the insertion of a tube end into the fitting. The dimple insertion stops 114 of the fitting 110 serve the same purpose as the annular insertion stop 100 of the fitting 90 depicted in FIG. 14, but have been found to be easier to form into the fitting. Preferably there are two dimple insertion stops 114 spaced one hundred eighty degrees apart, but any number, including just one, would also suffice. Like the crimp fitting 90 depicted in FIG. 14, the crimp fitting 110 shown in FIGS. 17-21 is preferably formed of annealed copper and work hardens locally when crimped. The crimp fitting can be crimped to one or more tubes as described above in reference to the various other fittings described herein.

With any of the fittings described above, a sealant such as Loctite® 567 can be applied to the interior surface of the fitting, prior to inserting a tube or tubes thereinto. As a tube end is inserted into a fitting having sealant, the sealant is forced axially outward toward the axial end of the fitting when the tube end radially compresses the O-ring. The sealant is forced still further outward when the fitting is crimped. The sealant further improves the sealing capability of the fitting-to-tube joint.

A corrosion resistant coating (e.g., tin, nickel, paint, polymer) can also be applied to any of the fittings described above to help prevent dissimilar metal corrosion (particularly in situations where a copper fitting is attached to a non-copper tube, such as an aluminum tube).

In view of the foregoing, it should be appreciated that the present invention overcomes various disadvantages associated with prior art methods of joining tubes in refrigeration line sets. Crimp fittings in accordance with the present invention and the methods utilized with the same are capable of forming joints that can withstand internal pressures in excess of 2,100 pounds per square inch (14.5 MPa).

As various modifications could be made in the constructions and methods herein described and illustrated without departing from the scope of the invention, it is intended that all matter contained in the foregoing description or shown in the accompanying drawings shall be interpreted as illustrative rather than limiting. For example, although some of the methods described above form a single primary crimp around an annular portion adjacent each end of the crimp fitting, multiple crimps can be formed around multiple spaced-apart annular portions adjacent each end of the crimp fitting to provide additional interlocking geometry between the crimp fitting and the tubes to thereby improve the pullout strength of the joint. This can be done in one action using a two-jaw crimping tool configured to form a plurality of crimps simultaneously. Additionally, it should be appreciated that, although the fittings described herein are configured to join two tubes in a coaxial manner, a fitting in accordance with the invention could have an elbow or bend so as to be configured to join tubes at various other angles such as forty-five degrees or ninety degrees. Similarly, a fitting in accordance with the invention could be a Tee fitting and/or a reducer. Still further, while crimp fittings in accordance with the invention are preferably formed in an annealed condition, they need not be. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A crimp fitting comprising a metal tube wall that forms both a cylindrical tube portion and an adjacent annular O-ring channel portion, the tube wall having a first wall thickness along the cylindrical tube portion and a second wall thickness along at least part of the O-ring channel portion, the second wall thickness being less than the first wall thickness, the cylindrical tube portion and O-ring channel being configured and adapted to encircle a cylindrical end portion of a tube when such end portion of the tube is inserted into the fitting, the tube wall also forming an annular positioning protrusion, the cylindrical tube portion being between the O-ring channel portion and the annular positioning protrusion, the annular positioning protrusion having an exterior surface that protrudes radially outward relative to the cylindrical tube portion, the exterior of the tube wall protruding radially outward at the O-ring channel portion relative to the adjacent cylindrical tube portion, the annular positioning protrusion and the O-ring channel portion of the tube wall forming an exterior locating cradle therebetween that is configured to constrain a crimping tool at the cylindrical tube portion of the fitting.

2. The crimp fitting of claim 1 wherein the tube wall comprises copper.

3. The crimp fitting of claim 2 wherein the tube wall is annealed to a grain size in the range of 0.005 to 0.070 millimeters.

4. The crimp fitting of claim 3 wherein the tube wall is annealed to a grain size in the range of 0.015 to 0.035 millimeters.

5. The crimp fitting of claim 1 wherein the second wall thickness is less than 82% of the first wall thickness.

6. The crimp fitting of claim 1 further comprising an elastic O-ring that is engaged with and encircled by the O-ring channel portion of the tube wall.

7. The crimp fitting of claim 1 further comprising a molded gasket formed in the O-ring channel portion of the tube wall.

8. The crimp fitting of claim 1 wherein the tube wall further forms an insertion stop that protrudes radially inward relative to the cylindrical tube portion, and the O-ring channel portion of the tube wall is spaced from the insertion stop and is between the insertion stop and the cylindrical tube portion.

9. The crimp fitting of claim 1 wherein the tube wall is formed out of copper and is annealed to a grain size in the range of 0.005 to 0.070 millimeters, the second wall thickness is less than 82% of the first wall thickness, the tube wall further forms an insertion stop that protrudes radially inward relative to the cylindrical tube portion, and the O-ring channel portion of the tube wall is spaced from the insertion stop and is between the insertion stop and the cylindrical tube portion.

10. The crimp fitting of claim 1 wherein the cylindrical tube portion, the annular protrusion, and the O-ring channel portion are formed on a first axial half of the fitting and the fitting comprises a second axial half formed by the tube wall that is a mirror image of the first axial half.

11. The crimp fitting of claim 10 wherein the tube wall further forms an insertion stop that protrudes radially inward relative to the cylindrical tube portion and that is positioned centrally between the first and second axial halves of the fitting.

12. The crimp fitting of claim 1 wherein the tube wall comprises copper and has a corrosion resistant coating.

* * * * *